United States Patent [19]

Westerman, Jr.

[11] Patent Number: 4,535,224
[45] Date of Patent: Aug. 13, 1985

[54] APPARATUS FOR USE IN TRIMMING OF MOLDED RECORDS

[75] Inventor: Harry H. Westerman, Jr., Middle Township, Hendricks County, Ind.

[73] Assignee: RCA Corporation, Princeton, N.J.

[21] Appl. No.: 544,829

[22] Filed: Oct. 24, 1983

[51] Int. Cl.³ .................... H05B 1/00; F24H 3/04; B29C 17/12
[52] U.S. Cl. ................... 219/373; 219/369; 425/810
[58] Field of Search ............... 82/1.1; 219/373, 374, 219/369; 425/810, 297, 305.1, 315, 806 R; 264/107, 161, 162, 163

[56] References Cited

U.S. PATENT DOCUMENTS

| | | | |
|---|---|---|---|
| 2,475,910 | 7/1949 | Morrison | 219/369 |
| 2,630,519 | 3/1953 | Gard | 83/170 |
| 3,702,749 | 11/1972 | Flusfeder | 425/810 |
| 3,873,029 | 3/1975 | Mihaly | 219/373 |
| 3,941,547 | 3/1976 | Hunyar | 425/810 |
| 4,287,673 | 9/1981 | Wolter | 219/369 |

FOREIGN PATENT DOCUMENTS 200725  6/1983  German Democratic Rep. ... 83/170
878562 10/1961  United Kingdom ................. 83/171

Primary Examiner—Roy N. Envall, Jr.
Assistant Examiner—Teresa J. Walberg
Attorney, Agent, or Firm—Birgit E. Morris; Edward J. Sites

[57] ABSTRACT

An apparatus is disclosed for use in trimming of flash from molded thermoplastic records. The records which are advantageously trimmed using the apparatus of this invention have the flash secured to the outer diameter of the molded record with a web having a thickness which is substantially less than the thickness of the molded record and the principal portion of the flash. The apparatus of this invention has a turntable for holding the record during trimming and a manifold means for directing a heated gas over the web so as to selectively heat and soften the web thereby facilitating the trimming of the flash and final finishing of the outer diameter of the record.

6 Claims, 3 Drawing Figures

APPARATUS FOR USE IN TRIMMING OF MOLDED RECORDS

This invention relates to an apparatus for use in the trimming of flash from molded records. More particularly this invention is concerned with apparatus for selectively softening a portion of the flash formed on the outer diameter of a molded record during molding so as to facilitate the trimming of the flash from the record.

BACKGROUND OF THE INVENTION

Molded records such as conventional audio records or the more recently developed capacitive electronic discs, are conventionally manufactured by compression molding of a thermoplastic composition. The thermoplastic compositions used to mold records are comprised of a thermoplastic resin; such as polyvinyl chloride, polyvinyl acetate, polystyrene and the like, and additives such as stablizers, lubricants, antistatic agents and carbon black. In the compression molding process a preform is initially formed which contains an amount of the thermoplastic composition which is somewhat in excess of the amount of material actually needed to mold the record in order to insure that when the record is pressed it will not have any voids and will be of uniform density.

The preform is placed in a record molding press between a pair of stampers which are heated to an elevated temperature above the melting point of the thermoplastic composition. The molding press in then closed which causes the heated stampers to both heat the thermoplastic composition of the preform above its melting point and to cause the resulting molten thermoplastic composition to flow between the stampers to form a record. During the molding process the excess amount of the thermoplastic composition from the preform will flow past the outer edges of the stampers and will form an irregular ring of material around the outer diameter of the molded record which is referred to as flash. After the molten thermoplastic material has been pressed between the heated stampers, the stampers are then cooled which in turn causes the thermoplastic composition to solidify.

After the molded record is solidified the flash which is formed on the outer diameter of the record must be removed and the outer diameter of the record trimmed to a specified final diameter. Various types of trimming apparatus which are generally well known in the art can be used to remove the flash. The type of trimmers which are commonly used include, for example, scissors cutters, knife cutters, routers and the like.

A serious production problem, which is referred to as breakout, is encountered with all of the commonly used types of trimmers. Breakout occurs in the trimming step when the flash does not separate cleanly from the outer diameter of the molded record and causes a portion of the molded record is broken out along with the flash; or when the edge of the record is cracked; or other similar defects occur, all of which causes destruction of the molded record. Breakout is also often encountered during the final trimming of the outer diameter of the record.

While the exact cause of the breakout problem is not known for certain it is believed to be due in part to the relative brittle nature of the solidified thermoplastic compositions used in the molding of records. This appears to be true particularly with regard to the thermoplastic compositions used for capactitive electronic discs. Capacitive electronic disc must be electrically conductive. In order to obtain the required electrical conductivity the resin compositions are heavily loaded with conductive carbon black which causes substantial embrittlement of the solidified thermoplastic composition.

It would be highly desirable to have apparatus which would prevent breakout during removal of the flash and the final finishing of the outer diameter of the thermoplastic records.

SUMMARY OF THE INVENTION

An apparatus is disclosed for use in trimming flash from molded thermoplastic records. The records which are advantageously trimmed using the apparatus of this invention have the major portion of the flash secured to the outer diameter of the molded record with a web of a uniform thickness substantially less than the thickness of the molded record and the principal portion of the flash. The apparatus of this invention has a turntable for holding the record during trimming and a manifold for directing a heated gas over the web so as to selectively heat and soften the web prior to trimming and thereby facilitate the trimming of the flash and the final trimming of the outer diameter of the record.

DETAILED DESCRIPTION OF THE INVENTION

Figure 1:
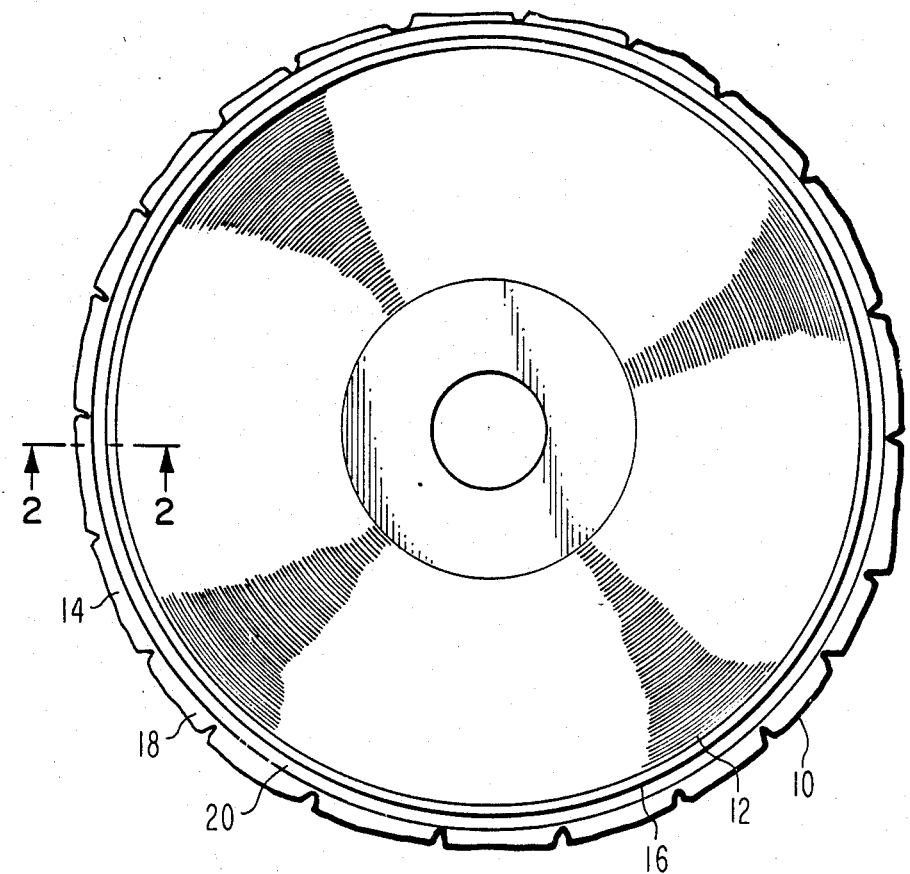
FIG. 1 is a top plan view of a molded record having the molding flash still attached to the outer diameter of the record.
Figure 2:
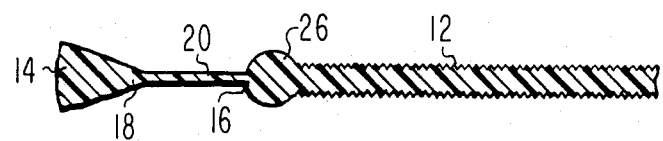
FIG. 2 is a cross-sectional view taken as indicated by the lines and arrows 2,2 on FIG. 1.

In FIG. 1 there is illustrated a typical untrimmed molded part 10 which is formed during the compression molding of records. The desired final molded record 12 is formed in the center portion of the untrimmed molded part 10. The excess material 14 from the molding operation is attached to the outer diameter 16 of the molded record 12. The excess material is comprised of two parts; an irregular shaped outer portion 18 and a thin uniformly shaped band or web of material 20 The web material 20 is formed in a uniform thin configuration during molding the lands of the stampers (not shown). Generally all of the excess material 14 attached to the outer diameter 16 of the molded record 12 is referred to collectively as flash. However, for purposes of facilitating a further explanation of the present invention only the outermost, irregular shaped portion 18 will be specifically referred to as flash while the flat thin band of material 20 which secures the flash 18 to the outer diameter 16 of the molded record 12 will be specifically referred to as the web 20.

Figure 3:
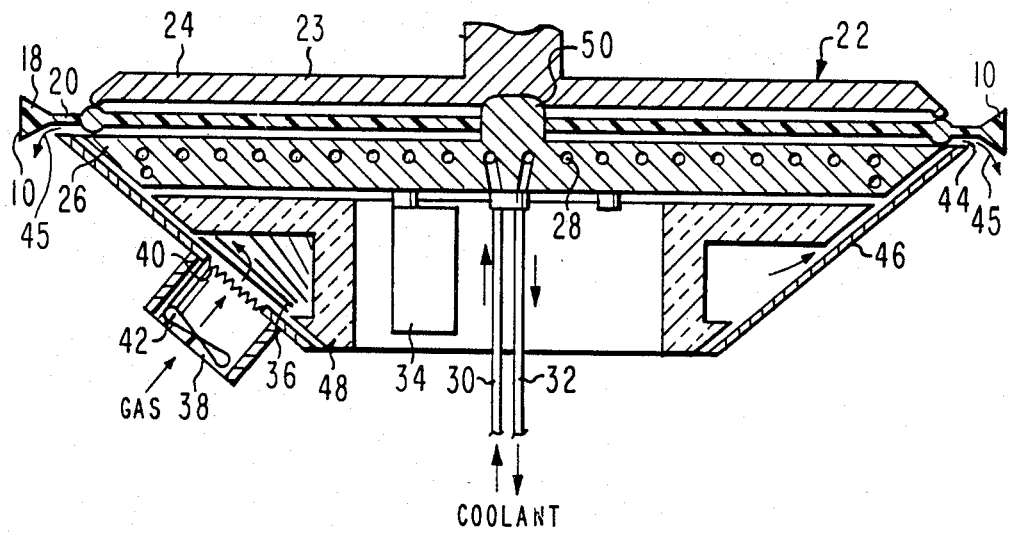
FIG. 3 is a schematic illustration in cross-section of the apparatus of the present invention.

The apparatus of this invention 22 which is used in the trimming of records 12 is illustrated in FIG. 3. The apparatus 22 includes a holding means 23 having an upper turntable 24 and a lower turntable 26 which are used in combination to hold an untrimmed part 10. The upper and lower turntables 24 and 26 are made of metal such as aluminum of steel. The upper and lower turntables 24,26 have a diameter which is approximately the same as the outer diameter 16 of the finished molded record 12 and are designed to grip the outer edge 16 of the record 12 while leaving the flash 18 and the web 20 exposed. The lower turntable 26 preferably includes means for cooling the turntable 26 for reasons which will be explained in greater detail below. As illustrated in FIG. 3 the cooling means 28 includes inlet and outlet pipes 30,32 which supply coolant to tubes 33 formed in the lower turntable 26.

Positioned below the lower turntable 26 is a circular manifold 36 which extends around the entire diameter of the lower turntable. The manifold 36 has an inlet port 38 for the introduction of a heated gas such as air or steam into the manifold. The manifold inlet port 38 is in communication with a heater 40, such as a resistance type heater, for raising the temperature of the gas and also is in communication with a fan 42 for maintaining a flow of the heated gas through the manifold 36. The heater 40 and the fan 42 must be adequate in capacity to heat the gas to a sufficiently high temperature and circulate the heated gas at a sufficient volume to cause rapid softening of the thermoplastic web 20 as will be explained below.

The manifold 36 has a circular outlet 44 which includes a guide plate 46 for directing the heated gas from the interior of the manifold 36 to the web 20.

The manifold 36 preferably is made of a heat insulating material 48 to prevent or at least reduce the amount of heat transferred to the lower turntable 26. It is important not to allow the lower turntable 26 to heat up excessively as heat will be transferred to the molded record 12 held between the turntables 24,26. If excessive heat is transferred to the record 12 during trimming it can cause the record 12 to soften and warp. The insulation 48 of the manifold 36 and/or the introduction of coolant into the lower turntable will prevent excessive heating of the molded record 12 being trimmed.

When using the apparatus of this invention an untrimmed part 10 is placed on the guide pin 50 of the lower turntable 26. The upper turntable 24 is then lowered so as to engage the raised outer edge 26 of the record 12. Air or another gas to be used to heat the web 20 is introduced into the manifold 36. The gas is heated to a temperature sufficiently high to soften the thermoplastic of the web 20. The fan 42 is activated to provide a forced flow of heated gas over the web 20. The heated gas escapes from the manifold through the circular outlet 44 and flows over the web as noted by the flow arrows 45 on FIG. 3.

If the apparatus 22 includes drive means 34 for rotating the turntables 24,26 it should be activated because rotation of the turntables 24,26 permits a more uniform heating of the web 20. The web 20 is heated until the web softens in the desired amount to facilitate trimming but less than the amount which will cause the record 12 to soften. While the exact temperature and flow of heated gas which is required to accomplish this can vary over wide limits depending on the thermoplastic composition employed, it has been found that if the gas used to heat the web is heated to a temperature of about 300° F. (150° C.) and is driven at a force of approximately 10 cubic feet per minute (280 liters per minute) that satisfactory results are normally obtained. Once the web has softened the desired amount a trimming tool (not shown) is then used in the conventional manner to trim the flash 18 and the web 20 from the outer diameter 16 of the record 12 and the outer diameter 16 of the record 12 is final finished to the specified diameter. The upper and lower turntables 24,26 are then separated and the finished record is then removed from the guide pin 50.

Using the apparatus for this invention 22 if the web is softened as noted above the problem of breakout is eliminated and the final record 12 will have a more accurate, smoother finished edge than was heretofore obtainable using the prior art apparatus.

I claim:

1. Apparatus for use in trimming of molded flash from an outer diameter of a record molded from a thermoplastic composition having a softening point wherein the molded flash is secured to the outer diameter of the record by a web of the thermoplastic composition which has a cross-sectional thickness which is substantially thinner than the outer diameter of the record and the flash; said apparatus comprising in combination:
   (a) a holding means for receiving and holding an untrimmed molded record, said holding means having an outer diameter which is approximately the same as the outer diameter of the final molded record;
   (b) manifold means for receiving and distributing a heated gas, said manifold means being positioned adjacent to the holding means and including an inlet port and a circumferential discharge orifice and guide means for selectively directing a heated gas introduced into the manifold means into heating contact with the web; and
   (c) means for heating a gas to a predetermined temperature and imparting a predetermined rate of flow to said gas; said means being in communication with the inlet port of the manifold means, said predetermined temperature and rate of flow being sufficient to produce a heated gas flow exiting from the discharge orifice sufficient to selectively soften the web;

whereby the flash and web can be more readily removed and the outer diameter of the record more precisely trimmed.

2. The apparatus according to claim 1 wherein the manifold means includes insulation to reduce heat transfer to said holding means.

3. The apparatus according to claim 1 wherein the holding means includes means for rotating a record held by the holding means.

4. The apparatus according to claim 1 wherein the holding means includes cooling means for maintaining a record held by said holding means above the softening point of the thermoplastic composition while the web is heated by the hot gas to its softening point.

5. The method according to claim 1 wherein the pre-determined temperature is about 300° F. (150° C.) and the flow rate is about 10 cubic feet per minute (280 liters per minute).

6. In the method for trimming flash from an outer diameter of a record molded from a thermoplastic composition wherein the flash is secured to the outer diameter of the record by a circumferential web of the thermoplastic composition having a cross-sectional thickness which is substantially less than the outer diameter of the record and the flash, the improvement which comprises: selectively heating the circumferential web by directing a flow of gas heated to a predetermined temperature sufficient to soften the thermoplastic composition into contact with the web and maintaining the flow of gas for a length of time sufficient to soften the thermoplastic of the web but less than that which will soften the thermoplastic composition of the record.

* * * * *

UNITED STATES PATENT AND TRADEMARK OFFICE
CERTIFICATE OF CORRECTION

PATENT NO. : 4,535,224
DATED : August 13, 1985
INVENTOR(S) : Harry H. Westerman, Jr.

It is certified that error appears in the above-identified patent and that said Letters Patent is hereby corrected as shown below:

Column 1, line 32, "in" should read --is--.

Column 2, line 50, "molding the" should read --molding between the--.

Column 4, line 50, "1" should read --6--.

Signed and Sealed this

Twelfth Day of November 1985

[SEAL]

Attest:

Attesting Officer

DONALD J. QUIGG

Commissioner of Patents and Trademarks